(12) United States Patent
Weissman et al.

(10) Patent No.: US 7,456,411 B2
(45) Date of Patent: Nov. 25, 2008

(54) HE-3 NEUTRON PROPORTIONAL COUNTER WITH INTERNAL LEAKAGE DETECTION AND RELATED METHOD

(75) Inventors: Eric M. Weissman, Chagrin Falls, OH (US); Lucas L. Clarke, Brussels (BE); James R. Williams, University Heights, OH (US); Thomas R. Anderson, Perry, OH (US)

(73) Assignee: General Electric Company, Schenectady, NY (US)

( * ) Notice: Subject to any disclaimer, the term of this patent is extended or adjusted under 35 U.S.C. 154(b) by 155 days.

(21) Appl. No.: 11/481,040

(22) Filed: Jul. 6, 2006

(65) Prior Publication Data

US 2008/0265171 A1 Oct. 30, 2008

(51) Int. Cl.
*G01T 3/00* (2006.01)
(52) U.S. Cl. ........................ 250/384; 250/382
(58) Field of Classification Search ............. 250/384, 250/382
See application file for complete search history.

(56) References Cited

U.S. PATENT DOCUMENTS

| 3,560,737 | A | * | 2/1971 | Skildum | ............ 250/384 |
| 3,617,804 | A | * | 11/1971 | Paine et al. | ............ 315/326 |
| 5,180,917 | A | | 1/1993 | Wraight | |

* cited by examiner

*Primary Examiner*—Constantine Hannaher
(74) *Attorney, Agent, or Firm*—Nixon & Vanderhye, PC

(57) ABSTRACT

A radiation detector includes a pressure-tight housing having a peripheral, cylindrically-shaped wall and opposite end closures. An electrode wire extends through a center of the housing, spaced from the cylindrically-shaped wall. A pressurized detector gas fills the housing, and circuit connections to the electrode wire and the housing permits application of an electric potential thereto. The electrode wire is composed of a material providing a source of alpha particles for ionizing the gas within the housing, generating an alpha peak on the output spectrum distinct from the peak generated by incident neutrons. A related method is also disclosed.

11 Claims, 1 Drawing Sheet

HE-3 NEUTRON PROPORTIONAL COUNTER WITH INTERNAL LEAKAGE DETECTION AND RELATED METHOD

This invention relates to radiation detectors and, specifically, to an He-3 neutron detector that incorporates an internal He-3 leak detector.

The most commonly used proportional neutron counters comprise metal cylinders filled with He-3 gas. At the opposite ends of the cylinder, there are interfaces and seals between metals and ceramics that sometimes result in leakage of He-3 gas from the cylinder. When such leakage occurs, the performance of the detector deteriorates.

Currently, other than constructing the detector with quality materials and workmanship to prevent leakage, He-3 proportional counters are not made with dedicated, active means for detecting a leak. The most important performance characteristic that a leak will affect is sensitivity which determines how effective the detector is in counting incident radiation. Presently, only after a significant loss of performance has occurred will a leak be suspected and the detector taken out of service for repair or replacement. However, in critical applications, it is desirable to detect the leakage problems at the earliest possible time, so as to minimize the possibility of undercounting neutron flux.

BRIEF SUMMARY OF THE INVENTION

In accordance with an exemplary embodiment, there is disclosed herein an He-3 neutron radiation detector that contains the usual array of parts that are well known to practitioners in the art. In addition, however, the detector incorporates an anode wire that extends through the detector cylinder, but which also is designed to serve as an alpha source that generates a peak distinct from the neutron spectrum generated by incident neutrons. This is accomplished by using thoriated tungsten for the anode material. The generated alpha peak will appear at a specific point in the output spectrum whenever the device is electrically energized. More specifically, when an He-3 leak occurs, the pressure within the detector will drop, causing the alpha peak to shift to higher values, i.e., to a different point on the spectrum, thus enabling early detection of the leak.

Accordingly, in one aspect, the present invention relates to a radiation detector comprising a pressure-tight housing having a peripheral, cylindrically-shaped wall and opposite end closures; an electrode wire extending through a center of the housing, spaced from the cylindrically-shaped wall; a pressurized detector gas within the housing; and circuit connections to the electrode wire and the housing for application of an electric potential thereto, wherein the electrode wire is composed of a material providing a source of alpha particles for ionizing the gas within the housing.

In another aspect, the invention relates to a method of detecting an He-3 gas leak from a neutron detector housing comprising: (a) using thoriated tungsten as an anode wire extending through the housing, the anode wire serving as a source of alpha particles emitted due to radioactive decay; (b) generating an alpha peak on an output spectrum distinct from a peak generated by neutron detection; and (c) monitoring the position of the alpha peak along the output spectrum as an indicator of He-3 leakage from the housing.

The invention will now be described in connection with the drawings identified below.

DETAILED DESCRIPTION OF THE INVENTION

Figure 1:
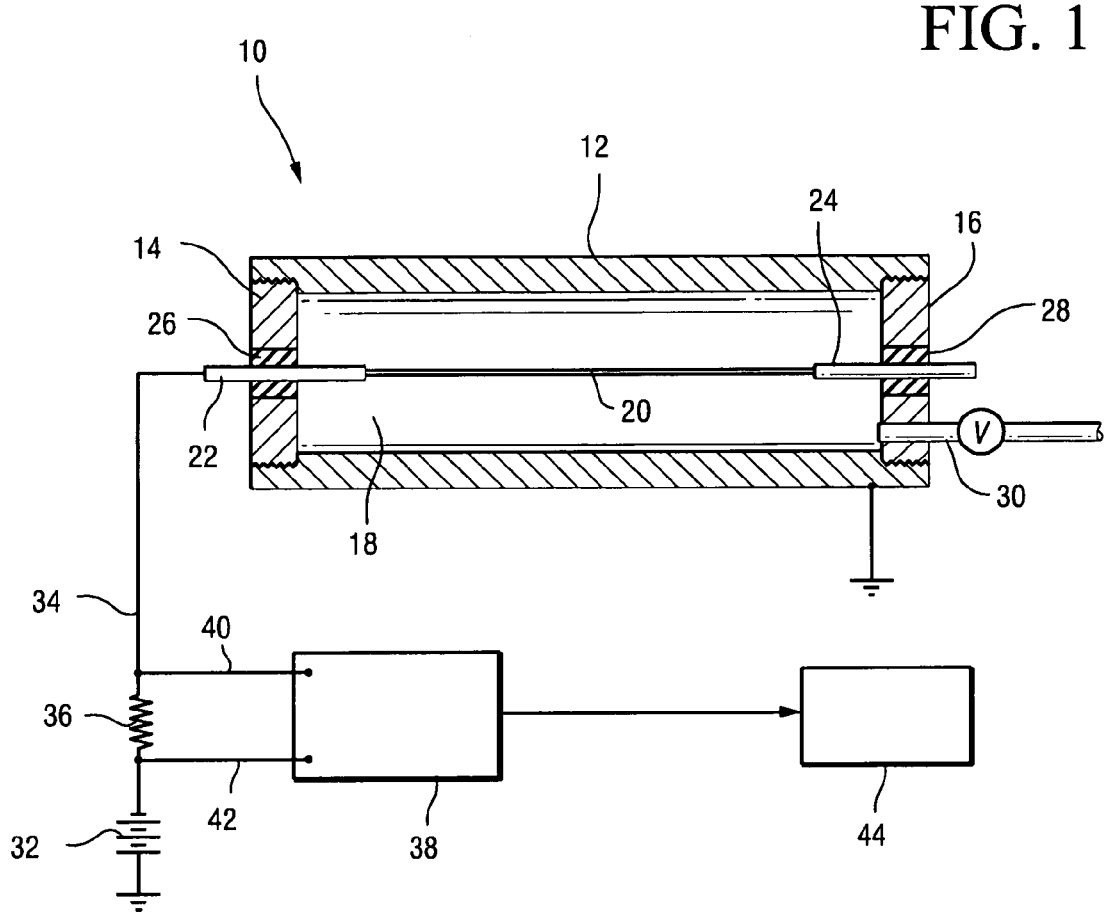
FIG. 1 is a schematic representation of a neutron radiation detector incorporating an anode wire in accordance with an exemplary embodiment of the invention.

With reference to FIG. 1, a neutron detector 10 is made up of a housing or cylinder 12 constructed of, for example, aluminum. At the opposite ends of the cylinder 10 may have ends caps 14, 16 threadably engaged with the cylinder 12 to thereby define an interior volume 18 forming a high gas pressure sealed chamber typically filled with He-3 gas at greater than atmospheric pressure. An electrode wire 20 substantially centered within the cylinder 12, is anchored in the end plates by any suitable means such as rods 22, 24 that extend through respective rings 26, 28 centered on the end plates. The rings 26, 28 are designed to mechanically maintain and electrically insulate the rods 22, 24 as well as the electrode wire 20 from the metallic end plates and cylinder. Thus, the rings 26, 28 may be constructed of quartz or ceramic material. A tube 30 is employed for supplying the chamber 18 with the He-3 gas.

The electrode wire 20 is electrically connected to a DC source 32 via line 34 and resistor 36. The cylinder 12 and the pole of the DC source 32 opposed to the resistor 36 are connected to ground. Voltage developed across the resistor 36 is applied to a pulse amplifier 38 via connections 40, 42 and signals output from the amplifier 38 are processed and transmitted to the surface equipment 44 through downhole circuits provided in the detector 10. To this point, the description of the detector is generally similar to a detector disclosed in U.S. Pat. No. 5,180,917 relating to downhole nuclear logging techniques. The embodiment described herein also has applications in medical systems, security devices, and the like.

Figure 2:
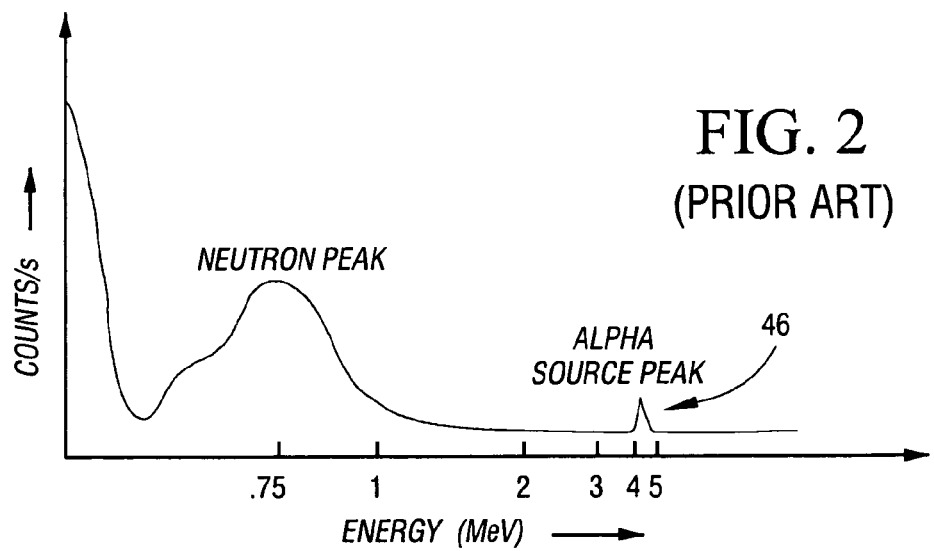
FIG. 2 is a schematic representation of a typical spectrum of dedicated neutrons and the ionization pulses generated by the radioactive source during use.

In accordance with an exemplary embodiment of this invention, the electrode wire 20 is an anode wire, composed of thoriated tungsten which also serves as an alpha source which emits alpha particles by radioactive decay. The thoriated tungsten alpha source will generate a peak distinct from the neutron spectrum that is generated by the incident neutrons. With reference to FIG. 2, notice that the alpha peak 44-46 appears at a specific point in the output spectrum whenever the device is electrically energized, but does not interfere with the neutron counts resulting from in situ neutron detection. For example, the alpha source may generate only a few counts per second, far below the lowest neutron count rate that is typically detected in operation in, for example, a borehole drilled in the earth. It is noteworthy that the He-3 detection is effective whether or not neutrons are currently being detected.

In the event of an He-3 leak, the internal pressure within the detector cylinder 12 will drop, causing the alpha peak 44-46 to shift along the neutron spectrum, and the shift in peak position indicates the presence of an He-3 leak.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A neutron radiation detector comprising a pressure-tight housing having a peripheral, cylindrically-shaped wall and opposite end closures; an electrode wire extending through a center of said housing, spaced from said cylindrically-shaped wall;
   a pressurized detector gas within said housing; and
   circuit connections to said electrode wire and said housing for application of an electric potential thereto, wherein said electrode wire is itself composed of a material that also provides a source of alpha particles for ionizing the gas within the housing.

2. The radiation detector of claim 1 wherein said electrode wire is composed of thoriated tungsten.

3. The radiation detector of claim 2 wherein said electrode wire comprises an anode wire.

4. The radiation detector of claim 1 wherein said pressurized detector gas is He-3.

5. The radiation detector of claim 4 wherein said source for alpha particles generates an alpha peak at a specific location along an output spectrum that is distinct from a neutron spectrum peak generated by incident neutrons.

6. The radiation detector of claim 1 wherein said electrode wire is connected to a DC source via a resistor.

7. The radiation detector of claim 6 wherein voltage developed across the resistor is applied to a pulse amplifier.

8. The radiation detector of claim 1 wherein said source for alpha particles generates an alpha peak at a specific location along an output spectrum that is distinct from a neutron spectrum peak generated by incident neutrons.

9. A method of detecting an He-3 gas leak from a neutron detector housing comprising:
   (a) using thoriated tungsten as an anode wire extending through the housing, the anode wire also serving as a source of alpha particles emitted due to radioactive decay;
   (b) generating an alpha peak on an output spectrum distinct from a peak generated by neutron detection; and
   (c) monitoring the position of the alpha peak along the output spectrum as an indicator of He-3 leakage from the housing.

10. The method of claim 9 wherein said electrode wire is connected to a DC source via a resistor.

11. The method of claim 10 wherein voltage developed across the resistor is applied to a pulse amplifier.

* * * * *